Figure 1:
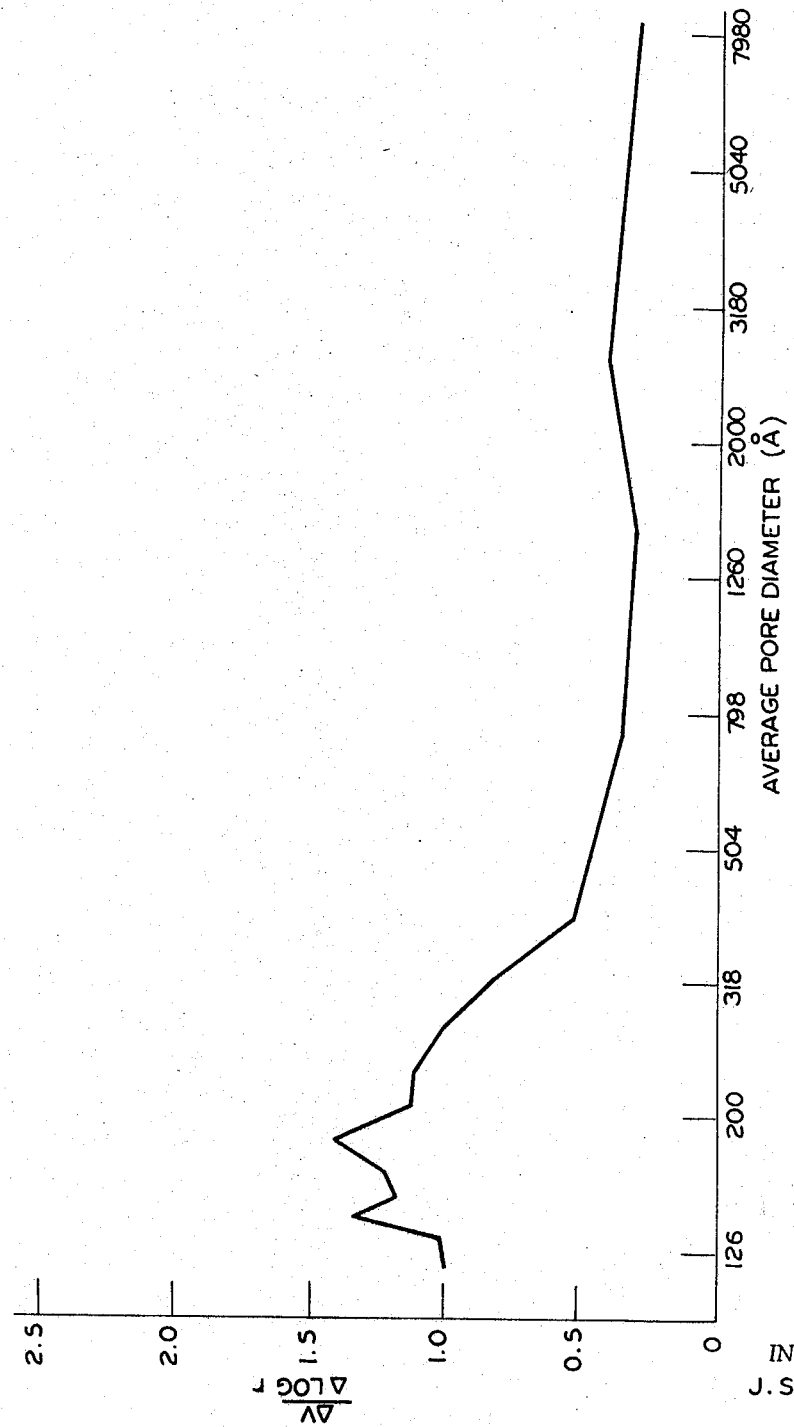

INVENTOR
J. S. MAGEE

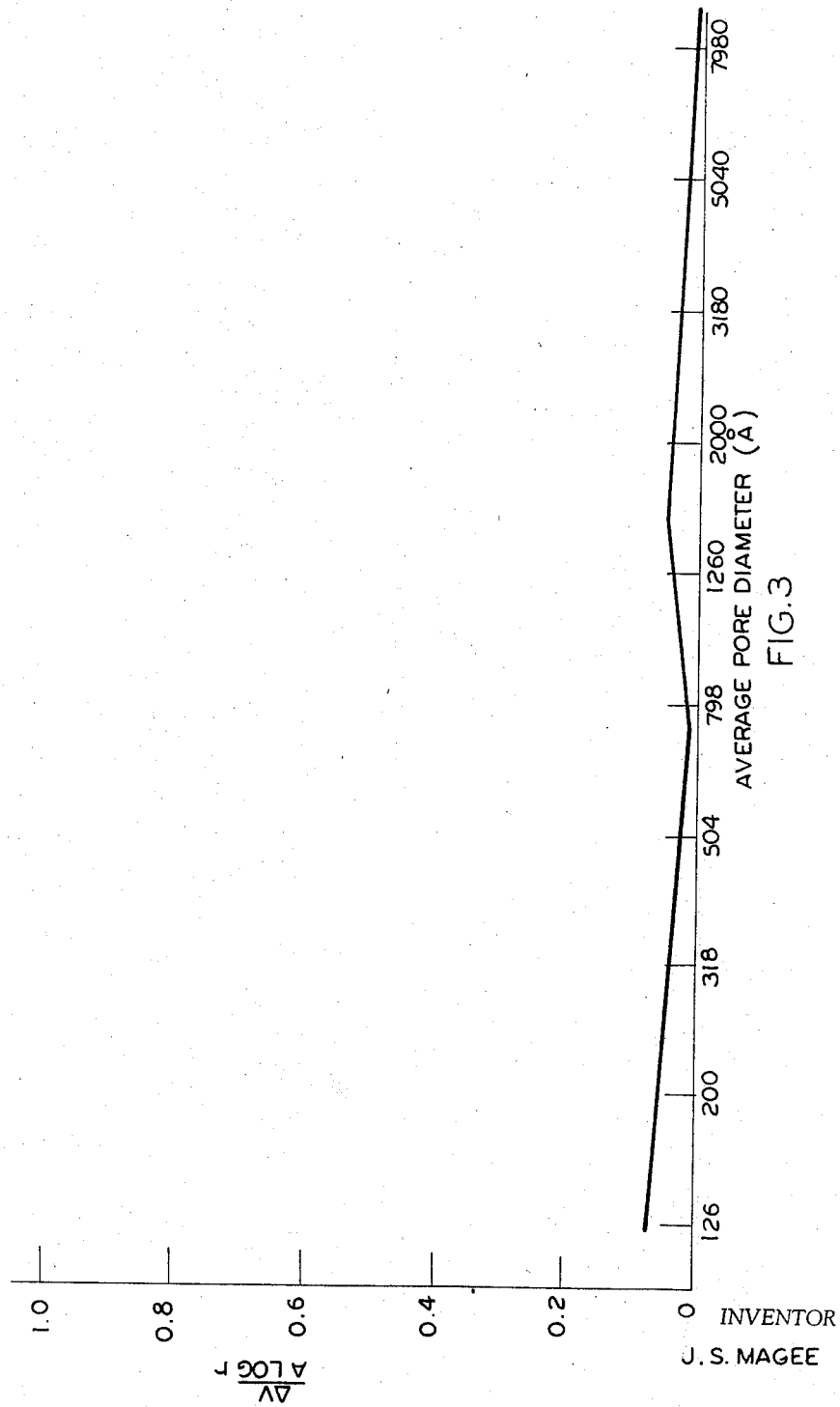

United States Patent Office 3,322,495
Patented May 30, 1967

3,322,495
PROCESS FOR PREPARING ALUMINA HAVING A NARROW PORE SIZE DISTRIBUTION
John Storey Magee, Baltimore, Md., assignor to W. R. Grace & Co., a corporation of Connecticut
Filed Apr. 30, 1964, Ser. No. 363,745
3 Claims. (Cl. 23—143)

This invention relates to the preparation of porous alumina. Specifically, it relates to a process for preparing alumina having a specific and narrow pore size distribution within the broad range of from 150 to 400 Angstrom units.

Hydrous aluminas, or alumina gels, are widely used as adsorbents, catalysts, and catalyst supports. For all these uses, alumina in certain pore size ranges exhibits more effectiveness than others for specific applications. In the past, it has been impossible to prepare alumina in which the maximum pore size distribution has been in a narrow, pre-selected range. Known procedures for preparing alumina include neutralization of an aluminum salt solution with base and reaction of sodium aluminate with mineral acid. These procedures result in a product having an extremely wide pore size distribution range with the majority of the pores having diameters less than 150 A. Prior art methods for controlling pore size have amounted to "after treatment" of this type of alumina. That is, the prepared alumina has been subjected to some treatment, usually an acid treatment, whereby certain pore sizes have been eliminated. This method results in the elimination of the small pores but with a concurrent loss of alumina, often as much as 10%.

I have discovered a method whereby alumina having a narrow pore size distribution within the range of about 150 to 400 Angstrom units can be prepared. Alumina prepared by my method has a more desirable pore size distribution than any prepared by prior art methods and involves no after treatment. The alumina as recovered in my process has a narrow pore size distribution. For any single preparation the maximum pore size distribution is around a single value within the range of 150 to 400 A.

Briefly, the process consists of preparing a sodium aluminate solution, neutralizing with formaldehyde, aging, washing, drying and activating the alumina product.

The products produced by my invention have high total mercury pore volumes and large average pore diameters.

The mercury pore volume is an accurate measure of pore volumes in the range of my product and is therefore used for characterizing my product. Mercury pore volume is determined by forcing mercury into the pores using a standard mercury porosimeter for the measurement. The mercury is forced into different size pores by varying the pressure exerted. For instance, at 100 p.s.i. absolute pressure, mercury can be forced into pores having a diameter above about 17,500 Angstroms. The method is described in detail by H. L. Ritter and L. C. Drake, Ind Eng. Chem. Anal. Ed., 17, 787 (1945). The mercury pore volume data in this application were measured at pressures from 0 to 15,000 p.s.i. Total mercury pore volumes (TMPV) of the products of my invention are in the range of from 0.6 to 2.44 cc. per gram.

The first step in my process consists of preparing an aqueous sodium aluminate solution ($Na_2O \cdot Al_2O_3 \cdot 3H_2O$). The concentration of this solution is not critical. Rather, it is the molar ratio of formaldehyde to sodium aluminate which must be controlled for best results.

The ratio of reactants (formaldehyde to sodium aluminate) can vary from 1 to 1 to about 5 to 1. The preferred ratio is about 4 to 1. The lower ratios and ratios above about 5 to 1 tend to give a lower pore size product than I desire to prepare, but the products are still superior to those prepared by basic neutralization or by mineral acid neutralization of sodium aluminate.

An aqueous formaldehyde solution is prepared to contain sufficient formaldehyde to give the selected ratio of reactants. The two solutions should be mixed rapidly and with vigorous stirring. Slow mixing tends to lead to low total mercury pore volume products. Reaction can take place either at ambient temperature or at reflux temperature. Since there is no advantage to be gained by heating, ambient temperature is preferred.

The reaction is allowed to progress for about 1 to 3 hours with some agitation. The mixture is then aged for about 14 to 18 hours at ambient temperature. The product alumina is filtered from the reaction mixture and washed well with deionized water to remove all traces of $Na_2O$. Removal of the sodium salt is important since my product is frequently used in catalyst preparations where the presence of sodium must be avoided. My product is granular and thus extremely easy to filter in contrast to the gelatinous precipitate produced in normal acid or base precipitation procedures. The product is dried at 110° C. for about 14 to 18 hours and finally calcined at 650° C. for about 4 to 6 hours.

My invention will be further explained by the following specific but non-limiting examples.

Example I

This run demonstrates a typical preparation of my product. A solution containing 6 moles of sodium aluminate ($Na_2O \cdot Al_2O_3 \cdot 3H_2O$) was mixed rapidly with a solution containing 25 moles of formaldehyde. The mixture was stirred for one hour, then aged for about 16 hours at ambient temperature. The precipitate was separated from the solution, dried at 110° C. for 16 hours and finally calcined for 5 hours at 650° C. The total mercury pore volume of the product was 1.32 cc./g. The average pore diameter distribution of the product is shown in FIGURE 1.

$$\frac{\Delta V}{\Delta \log r}$$

in the figure represents change in pore volume divided by change in log of pore radius. The maximum peak in the figure is found at 180 Angstroms which represents the average pore size distribution of my product.

Example II

This run, which was similar to that of Example I, produced a product having a pore diameter of approximately 400 A.

Figure 2:
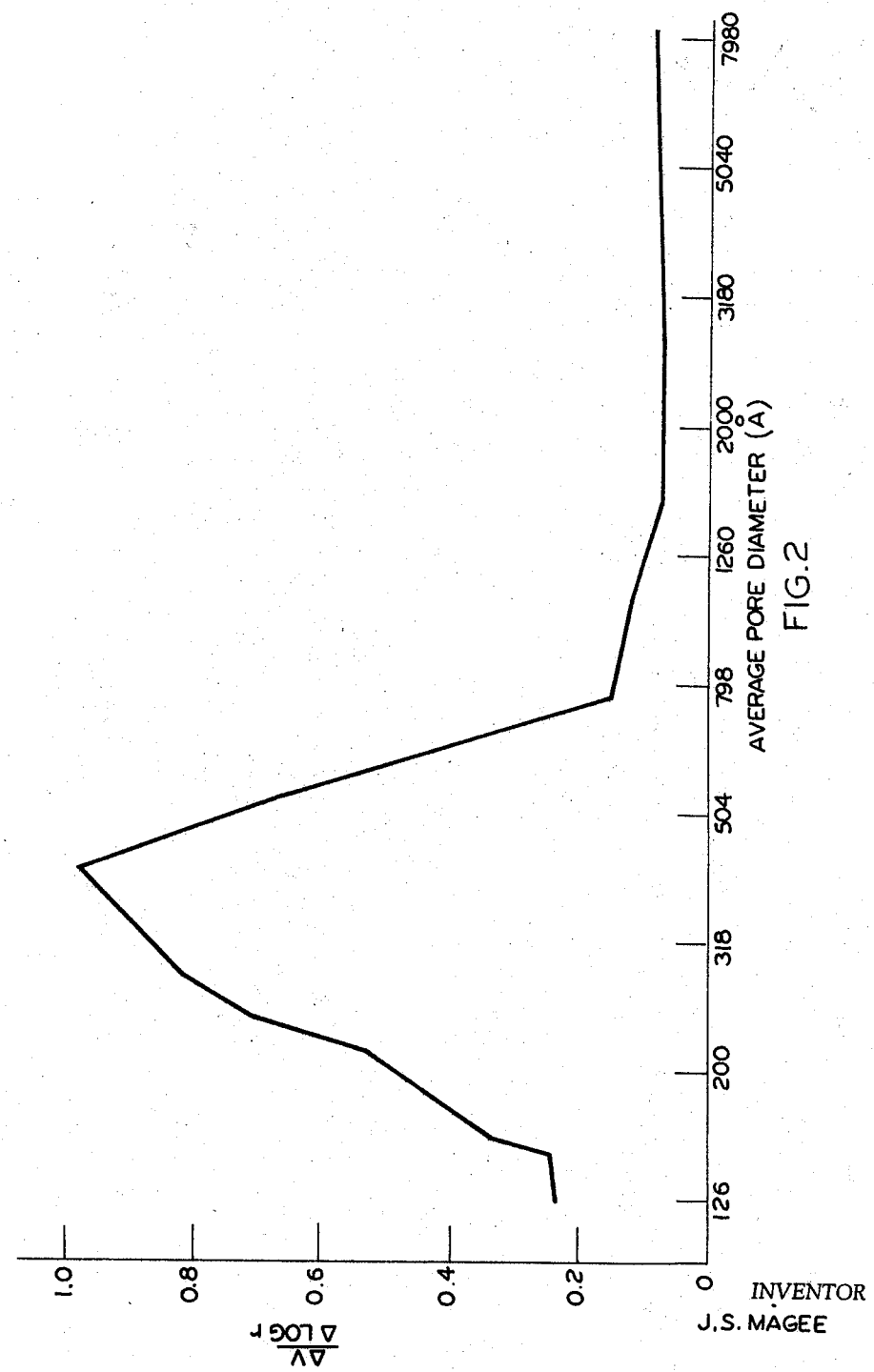

A solution containing 6 moles of sodium aluminate was mixed rapidly with a solution containing 25 moles of formaldehyde. The mixture was stirred for one hour, then aged for 16 hours at ambient temperature. The precipitate was filtered from the solution, dried at 110° C. for 16 hours and finally calcined for 5 hours at 650° C. The total mercury pore volume of the product was 1.4 cc./g. The average pore size distribution of the product was 394 A. as shown by FIGURE 2.

Example III

In this run, I prepared alumina using the standard acid technique. I used three different acids—hydrochloric, nitric and acetic acid. The technique used was the same for all three acids. A solution containing 0.3 mole of sodium aluminate was neutralized with a solution containing 0.6 mole of acid. The mixture was stirred for one hour, then aged for 16 hours at ambient temperature. The gelatinous precipitate was separated from excess solution, dried for 16 hours at 110° C. and finally calcined for 5 hours at 650° C. The total mercury pore volumes are set out in the table below:

| Acid used: | TMPV (cc./g.) |
|---|---|
| HCl | 0.0502 |
| $HNO_3$ | 0.186 |
| HOAc | 0.082 |

The average pore diameter distribution was below 120 Angstroms. FIGURE 3 shows the pore size distribution curve for the alumina prepared with HCl. As seen from the figure, there is no peak within the pore size range of interest. The same type of curve was obtained for the other two products.

It is obvious from the data that this acid neutralization technique will not produce a product having the majority of the pores in the 150 to 400 Angstrom diameter pore size range.

*Example IV*

This example illustrates the effect of two of the variables in my process.

The first is the effect of the ratio of reactants and the second is the effect of reaction temperature on the product.

Two similar batches of alumina were prepared using a sodium aluminate solution containing 0.6 mole of salt and a formaldehyde solution containing 0.62 mole of formaldehyde. One batch was allowed to react for one hour at ambient temperature. The other batch was reacted for an hour at 102° C. Following reaction, the two batches were aged for 16 hours at ambient temperature. The precipitates were separated from solution, dried at 110° C. for 16 hours and calcined at 650° C. for 5 hours. The total mercury pore volume of the batch prepared at ambient temperature was 1.05 cc./g. while that of the batch prepared at elevated temperature was 0.920 cc./g. It can be seen from these results that a product considerably better than the acid-prepared products of Example III can be prepared by my method even using a 1 to 1 ratio of reactants. However, the higher ratio of formaldehyde to sodium aluminate gives a product with a higher TMPV as demonstrated in Examples I and II. In addition, it can be seen that elevated reaction temperature has essentially no effect on the product.

What is claimed is:
1. A process for preparing alumina having a narrow pore size diameter distribution within the range of from 150 to 400 Angstroms, which comprises preparing an aqueous sodium aluminate solution, adding an aqueous formaldehyde solution so that the ratio of formaldehyde to sodium aluminate is 1:1 to 5:1, allowing the reaction to proceed for 1 to 3 hours to precipitate alumina, aging the mixture for about 14 to 18 hours at ambient temperature, separating the precipitate from the solution, washing the precipitate to remove sodium salts, drying for about 14 to 18 hours at 110° C., calcining for about 4 to 6 hours at 650° C. and finally recovering the alumina product.

2. A method for preparing porous alumina having a narrow pore size diameter distribution within the range of from 150 to 400 Angstroms, which comprises preparing an aqueous sodium aluminate solution, adding an aqueous formaldehyde solution in proportions to prepare a reaction mix having a 4 to 1 ratio of formaldehyde to sodium aluminate, allowing the reaction to proceed for 1 to 3 hours at ambient temperature to precipitate alumina, aging the mixture at ambient temperature for 14 to 18 hours, separating the precipitate from excess solution, washing the precipitate to remove sodium salts, drying for 14 to 18 hours at 110° C., calcining for 4 to 6 hours at 650° C. and finally recovering the alumina product.

3. A method for preparing porous alumina having a narrow pore size diameter distribution within the range of from 150 to 400 Angstroms which comprises preparing an aqueous sodium aluminate solution, adding an aqueous formaldehyde solution in proportions to prepare a reaction mix having a 4 to 1 ratio of formaldehyde to sodium aluminate, allowing the reaction to proceed for 1 to 3 hours at a temperature of about 100° C. to precipitate alumina, aging the mixture at ambient temperature for 14 to 18 hours, separating the precipitate from excess solution, washing the precipitate to remove sodium salts, drying for 14 to 18 hours at 110° C., calcining for 4 to 6 hours at 650° C. and finally recovering the alumina product.

References Cited

UNITED STATES PATENTS

| 3,027,234 | 3/1962 | Michalko | 23—143 |
| 3,193,349 | 7/1965 | Mooi | 23—143 |

OSCAR R. VERTIZ, *Primary Examiner.*

H. T. CARTER, *Assistant Examiner.*